(12) United States Patent
Rad et al.

(10) Patent No.: US 11,524,703 B2
(45) Date of Patent: Dec. 13, 2022

(54) METHOD AND SYSTEM FOR INTERACTIVE HYPOTHESIS ESTIMATION OF MULTI-VEHICLE TRAFFIC FOR AUTONOMOUS DRIVING

(71) Applicant: GM GLOBAL TECHNOLOGY OPERATIONS LLC, Detroit, MI (US)

(72) Inventors: Scott Rad, Santa Monica, CA (US); Hyukseong Kwon, Thousand Oaks, CA (US); Rajan Bhattacharyya, Sherman Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 252 days.

(21) Appl. No.: 17/103,301

(22) Filed: Nov. 24, 2020

(65) Prior Publication Data

US 2022/0161825 A1    May 26, 2022

(51) Int. Cl.
*B60W 60/00* (2020.01)
*B60W 40/06* (2012.01)

(52) U.S. Cl.
CPC ........ *B60W 60/0027* (2020.02); *B60W 40/06* (2013.01); *B60W 2420/42* (2013.01); *B60W 2420/52* (2013.01); *B60W 2554/4041* (2020.02); *B60W 2554/4044* (2020.02)

(58) Field of Classification Search
CPC ............. B60W 60/0027; B60W 40/06; B60W 2420/42; B60W 2420/52; B60W 2554/4041; B60W 2554/4044; B60W 2552/05; B60W 2552/10; B60W 2552/30; B60W 2552/50; B60W 2552/53; B60W 30/0956

See application file for complete search history.

(56) References Cited

U.S. PATENT DOCUMENTS 10,311,309 B2 *  6/2019  Janssen ................ B60W 50/00
2019/0324147 A1 * 10/2019  Day ........................ G01S 7/4817

* cited by examiner

*Primary Examiner* — Ian Jen
(74) *Attorney, Agent, or Firm* — Quinn IP Law (57) ABSTRACT

A system for interactive hypothesis estimation of multi-vehicle traffic for autonomous driving is provided. The system includes a sensor upon a host vehicle providing data regarding an operating environment of the host vehicle and a computerized device. The computerized device is operable to monitor the data from the sensor, identify a road surface based upon the data, and identify a neighborhood object based upon the data. The computerized device is further operable to determine a pressure score for the neighborhood object based upon a likelihood that the neighborhood object will conflict with the host vehicle based upon the road surface and the neighborhood object, selectively track the neighborhood object based upon the pressure score, and navigate the host vehicle based upon the tracking of the neighborhood object.

18 Claims, 5 Drawing Sheets

METHOD AND SYSTEM FOR INTERACTIVE HYPOTHESIS ESTIMATION OF MULTI-VEHICLE TRAFFIC FOR AUTONOMOUS DRIVING

INTRODUCTION

The disclosure generally relates to a method and system for interactive hypothesis estimation of multi-vehicle traffic for autonomous driving.

Autonomous vehicles and semi-autonomous vehicles utilize sensors to monitor and make determinations about an operating environment of the vehicle. The vehicle may include a computerized device including programming to estimate a road surface and determine locations and trajectories of objects near the vehicle.

SUMMARY

A system for interactive hypothesis estimation of multi-vehicle traffic for autonomous driving is provided. The system includes a sensor upon a host vehicle providing data regarding an operating environment of the host vehicle and a computerized device. The computerized device is operable to monitor the data from the sensor, identify a road surface based upon the data, and identify a neighborhood object based upon the data. The computerized device is further operable to determine a pressure score for the neighborhood object based upon a likelihood that the neighborhood object will conflict with the host vehicle based upon the road surface and the neighborhood object, selectively track the neighborhood object based upon the pressure score; and navigate the host vehicle based upon the tracking of the neighborhood object.

In some embodiments, the computerized device identifying the neighborhood object includes identifying a location of the neighborhood object and identifying an orientation of the neighborhood object.

In some embodiments, the computerized device identifying the neighborhood object further includes identifying a trajectory of the neighborhood object.

In some embodiments, the computerized device is further operable to monitor a trajectory of the host vehicle and compare the trajectory of the neighborhood object to the trajectory of the host vehicle. In some embodiments, the computerized device determining the pressure score for the neighborhood object is further based upon the comparing.

In some embodiments, determining the pressure score for the neighborhood object based upon the likelihood that the neighborhood object will conflict with the host vehicle based upon the road surface includes identifying lanes of travel upon the road surface.

In some embodiments, determining the pressure score for the neighborhood object based upon the likelihood that the neighborhood object will conflict with the host vehicle based upon the road surface further includes analyzing the lanes of travel and determining the likelihood based upon a context of the road surface.

In some embodiments, determining the pressure score for the neighborhood object based upon the likelihood that the neighborhood object will conflict with the host vehicle based upon the road surface further includes identifying an area upon the road surface that is one of coincident to, running parallel to and in a same direction as, and intersecting with a lane of travel occupied by the host vehicle. When the neighborhood object is within the area upon the road surface, determining the pressure score for the neighborhood object based upon the likelihood that the neighborhood object will conflict with the host vehicle based upon the road surface further includes determining that the pressure score is above a threshold value. When the neighborhood object is outside the area upon the road surface, determining the pressure score for the neighborhood object based upon the likelihood that the neighborhood object will conflict with the host vehicle based upon the road surface further includes determining that the pressure score is below the threshold value.

In some embodiments, selectively electing to track the neighborhood object based upon the pressure score includes, when the pressure score is above a threshold value, electing to track the neighborhood object. In some embodiments, selectively electing to track the neighborhood object based upon the pressure score includes, when the pressure score is below the threshold value, electing not to track the neighborhood object.

In some embodiments, the at least one sensor upon the host vehicle includes a LIDAR device providing data regarding the road surface and a camera device providing data regarding the neighborhood object.

According to one alternative embodiment, a method for interactive hypothesis estimation of multi-vehicle traffic for autonomous driving is provided. The method includes, within a computerized processor within a host vehicle, monitoring data regarding an operating environment of the host vehicle provided by a sensor upon the host vehicle, identifying a road surface based upon the data, and identifying a neighborhood object based upon the data. The method further includes, within the computerized processor, determining a pressure score for the neighborhood object based upon a likelihood that the neighborhood object will conflict with the host vehicle based upon the road surface and the neighborhood object, selectively electing to track the neighborhood object based upon the pressure score, and navigating the host vehicle based upon the tracking of the neighborhood object.

In some embodiments, identifying the neighborhood object includes identifying a location of the neighborhood object and identifying an orientation of the neighborhood object.

In some embodiments, identifying the neighborhood object further includes identifying a trajectory of the neighborhood object.

In some embodiments, the method further includes, within the computerized processor, monitoring a trajectory of the host vehicle and comparing the trajectory of the neighborhood object to the trajectory of the host vehicle. In some embodiments, determining the pressure score for the neighborhood object is further based upon the comparing.

In some embodiments, determining the pressure score for the neighborhood object based upon the likelihood that the neighborhood object will conflict with the host vehicle based upon the road surface includes identifying lanes of travel upon the road surface.

In some embodiments, determining the pressure score for the neighborhood object based upon the likelihood that the neighborhood object will conflict with the host vehicle based upon the road surface further includes analyzing the lanes of travel and determining the likelihood based upon a context of the road surface.

In some embodiments, determining the pressure score for the neighborhood object based upon the likelihood that the neighborhood object will conflict with the host vehicle based upon the road surface further includes identifying an area upon the road surface that is one of coincident to or intersecting with a lane of travel occupied by the host vehicle. When the neighborhood object is within the area upon the road surface, determining the pressure score for the neighborhood object based upon the likelihood that the neighborhood object will conflict with the host vehicle based upon the road surface further includes determining that the likelihood is above a threshold value. When the neighborhood object is outside the area upon the road surface, determining the pressure score for the neighborhood object based upon the likelihood that the neighborhood object will conflict with the host vehicle based upon the road surface further includes determining that the likelihood is below the threshold value.

In some embodiments, selectively electing to track the neighborhood object based upon the pressure score includes, when the pressure score is above a threshold value, electing to track the neighborhood object. In some embodiments, selectively electing to track the neighborhood object based upon the pressure score includes, when the pressure score is below the threshold value, electing not to track the neighborhood object.

In some embodiments, monitoring the at least one sensor upon the host vehicle includes monitoring a LIDAR device providing data regarding the road surface and monitoring a camera device providing data regarding the neighborhood object.

DETAILED DESCRIPTION

An autonomous and semi-autonomous host vehicle includes a computerized device operating programming to navigate the vehicle over a road surface, follow traffic rules, and avoid traffic and other objects. The host vehicle may include sensors such as a camera device generating images of an operating environment of the vehicle, a radar and/or a light detection and ranging (LIDAR) device, ultrasonic sensors, and/or other similar sensing devices. Data from the sensors is interpreted, and the computerized device includes programming to estimate a road surface and determine locations and trajectories of objects near the vehicle. Additionally, a digital map database in combination with three dimensional coordinates may be utilized to estimate a location of the vehicle and surroundings of the vehicle based upon map data.

Computational load describes a number of computations or determinations that a computerized device will to perform to accomplish as task. Interpreting sensor data, map and coordinate data, and making determinations to navigate the host vehicle through an operating environment may include substantial or prohibitive computational load.

A method and system to estimate the dynamics of other agents utilizing dimensionality reduced hypothesis interaction with pressure scores is provided. A pressure score is a virtual force that is calculated based on neighborhood objects, the host vehicle, and road feature states. A high pressure score indicates that a trajectory of the host vehicle and a trajectory of a neighborhood object are likely to come into conflict and, therefore, associated computerized determinations may be given priority. A low pressure score indicates that the trajectory of the host vehicle and the trajectory of the neighborhood object are unlikely to come into conflict, and, therefore, associated computerized determinations may be given low priority or may be "pruned" from a list of computerized determinations to be made.

According to one embodiment, the computerized device of the host vehicle may perform cascaded neighborhood filtering for agent pruning by assessing pressure scores. The determinations made by the computerized device may be described as interactive agent hypothesis generation reactive to traffic and other road features.

Pressure scores affect the accelerations of the mobile objects, then their velocities and positions accordingly to generate more accurate situation awareness. Higher pressure scores mean that the host vehicle may be affected more by neighborhood vehicles (higher interaction potential, etc.). By determining pressure scores, the system may evaluate the neighborhood traffic situations.

By using pressure scores to assign or conserve computational resources upon an object that poses a potential conflict with the host vehicle, additional computational resources may be focused on the object. As a result, reaction times for the host vehicle reacting to avoid or increase a distance from the object are improved or decreased, and more computational resources may be devoted to safely reacting to the object and avoiding the conflict. Pressure scores may be utilized to determine whether or not to track the object and navigate the vehicle based upon the tracking of the object.

Figure 1:
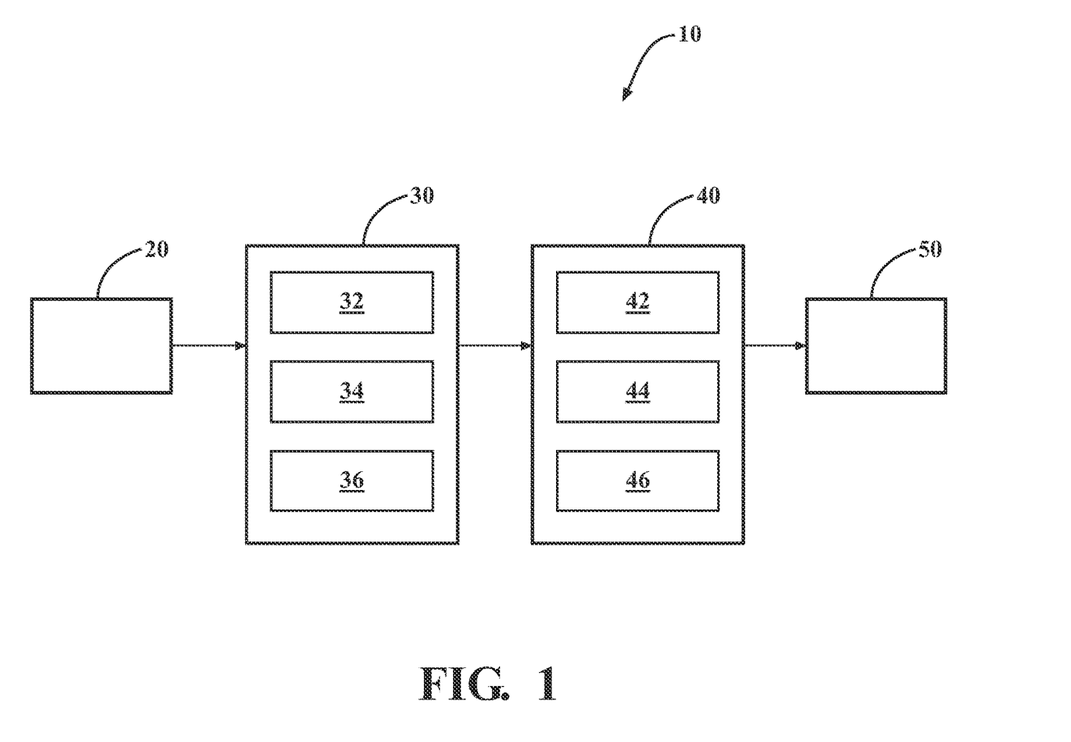
FIG. 1 schematically illustrates an exemplary computerized data flow for interactive hypothesis estimation of multi-vehicle traffic for autonomous driving, in accordance with the present disclosure.

FIG. 1 schematically illustrates an exemplary computerized data flow 10 for interactive hypothesis estimation of multi-vehicle traffic for autonomous driving. The computerized data flow 10 illustrates data generated by an electronic device and/or computerized programming used to process data within a computerized device. The computerized data flow 10 includes a sensor device 20. The sensor device 20 may include a camera device, a radar device, a LIDAR device, or other sensor device useful to provide data regarding an operating environment of the host vehicle. A road surface filtering module 30 receives data from sensor device 20 and applies one or more filters to road surface data collected regarding the operating environment of the host vehicle. In particular, the actions of the various filters increase or decrease pressure scores from an initial default pressure score. In the embodiment of FIG. 1, the road surface filtering module 30 includes a traffic control filtering module 32, a signal/sign filtering module 34, and a lane filtering module 36. The traffic control filtering module 32 includes programming to interpret information related to a flow of traffic as directed by objects, obstacles, etc. The signal/sign filtering module 34 includes programming to interpret information related to traffic signals such as stop lights and traffic signs such as stop signs and their effect upon traffic upon the roadway. The lane filtering module 36 includes programming to interpret information related to the road surface and lane markings directing traffic upon the roadway. Data is provided to a neighborhood object filter module 40 which applies one or more filters to neighborhood object data collected regarding a nearby object in the operating environment of the host vehicle. In the embodiment of FIG. 1, the neighborhood object filtering module 40 includes a proximity filtering module 42, a distance filtering module 44, and an orientation filtering module 46. The proximity filtering module 42 includes programming to determine a location of or a location relative to the host vehicle of the nearby object. The distance filtering module 44 includes programming to estimate distance of detected objects from the host vehicle. The orientation filtering module 46 includes programming to estimate an orientation of detected objects. Through the programming of the road surface filtering module 30 and the neighborhood object filtering module 40, data provided by the sensor device 20 may be processed and a pressure score may be determined. A clustered objects module 50 may include programming to process the data and the pressure score, process data to identify relevant objects in the operating environment of the host vehicle and assign a pressure score for the objects. The clustered objects module 50 may provide an output including a list of neighborhood objects that have not been pruned and that are still being tracked as a list of clustered objects. Through use of the disclosed filters and the assigned pressure scores, the programming may prune away objects that are not relevant to safely navigating the host vehicle and focus computational resources upon objects that may impact safe navigation of the host vehicle.

Figure 2:
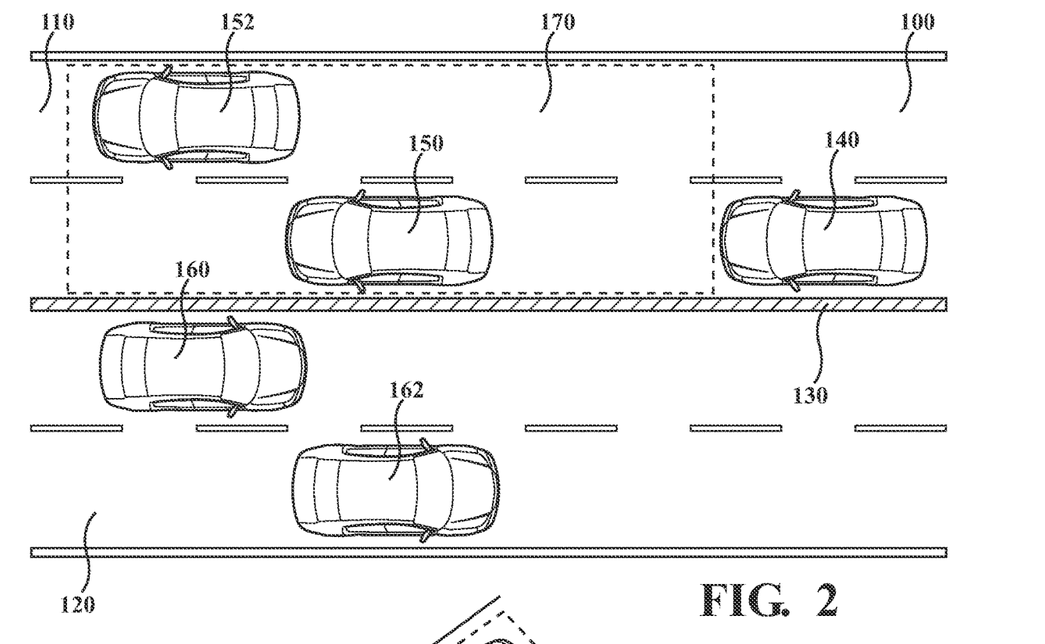
FIG. 2 illustrates an exemplary freeway with two-way traffic including a host vehicle operating the disclosed methods, in accordance with the present disclosure.

FIG. 2 illustrates an exemplary freeway 100 with two-way traffic including a host vehicle 140 operating the disclosed methods. The host vehicle 140 is illustrated traveling upon a first set of lanes 110 which are traveling from right to left in FIG. 2. A neighborhood vehicle 150 and a neighborhood vehicle 152 are illustrated traveling also upon lanes 110 in the same approximate direction as the host vehicle 140. The first set of lanes 110 are coincident to, running parallel to and in a same direction as, or intersecting with a lane occupied by the host vehicle 140. As a result, neighborhood vehicles occupying the first set of lanes 110 may reasonably come into conflict with the host vehicle 140. As a result, the neighborhood vehicle 150 and the neighborhood vehicle 152 may not be immediately pruned away from a list of objects to be tracked.

The freeway 100 includes a second set of lanes 120. A neighborhood vehicle 160 and a neighborhood vehicle 162 are illustrated upon the lanes 120 traveling from left to right in FIG. 2. The first set of lanes 110 are separated from the second set of lanes 120 by a divider 130. Sensors upon the host vehicle 140 provide data to a computerized device within the host vehicle 140 operating the programming described herein. Data regarding the freeway 100 and the lanes thereupon, the divider 130, and the neighborhood vehicles upon the lanes are filtered and interpreted. The second set of lanes 120 are not coincident to, running parallel to and in a same direction as, or intersecting with the lane occupied by the host vehicle 140. Under normal circumstances and without more information, the neighborhood vehicle 160 and the neighborhood vehicle 162 traveling normally upon the second set of lanes 120 may not be likely to come into conflict with the host vehicle 140. Based upon the programmed interpretations and the context of the road surface, the computerized device within the host vehicle 140 may prune away data related to objects that are unlikely to come into conflict with the host vehicle 140, such as data related to the second set of lanes 120 and the neighborhood vehicle 160 and the neighborhood vehicle 162 thereupon. An area 170 upon the first set of lanes 110, being either coincident to, running parallel to and in a same direction as, or intersecting with the lane occupied by the host vehicle 140, may be identified as a potentially high risk area. The area 170, based upon the context of the road surface, may be identified containing objects that may come into conflict with the host vehicle 140, a likelihood of conflict with the host vehicle 140 for objects within that the area 170 may be determined to be high, and computational resources may be focused upon objects such as the neighborhood vehicle 150 and the neighborhood vehicle 152 within the area 170. Objects outside of area 170 may be determined to have a low likelihood of conflict with the host vehicle 140.

Figure 3:
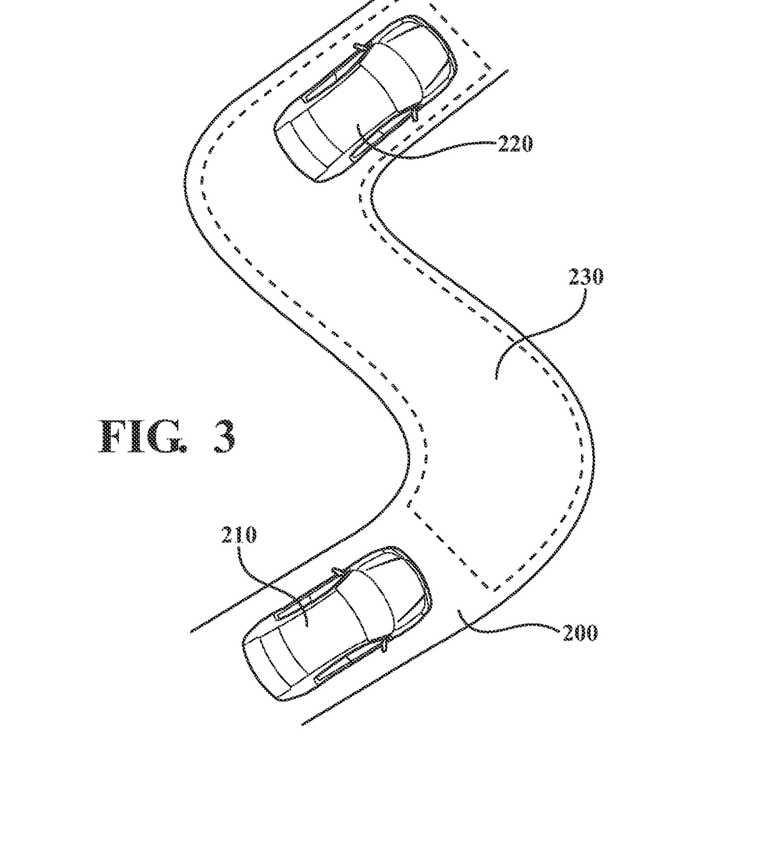
FIG. 3 illustrates an exemplary curved roadway with one-way traffic including a host vehicle operating the disclosed methods, in accordance with the present disclosure.

FIG. 3 illustrates an exemplary curved roadway 200 with one-way traffic including a host vehicle 210 operating the disclosed methods. The host vehicle 210 is illustrated traveling upon the curved roadway 200 which includes a single curved lane in an S-shape. A neighborhood vehicle 220 is illustrated traveling also upon the curved roadway 200, traveling upon the S-shaped curved lane in a same direction as the host vehicle 210. Sensors upon the host vehicle 210 provide data to a computerized device within the host vehicle 210 operating the programming described herein. Data regarding the curved roadway 200 and the lane thereupon, and the neighborhood vehicle 220 upon the lanes are filtered and interpreted. Based upon the programmed interpretations, the computerized device within the host vehicle 210 may interpret a context of the curved roadway 200 and the neighborhood vehicle 220. An area 230 upon the curved roadway 200 may be identified containing objects that may come into conflict with the host vehicle 210, and computational resources may be focused upon objects such as the neighborhood vehicle 220 within the area 230.

Figure 4:
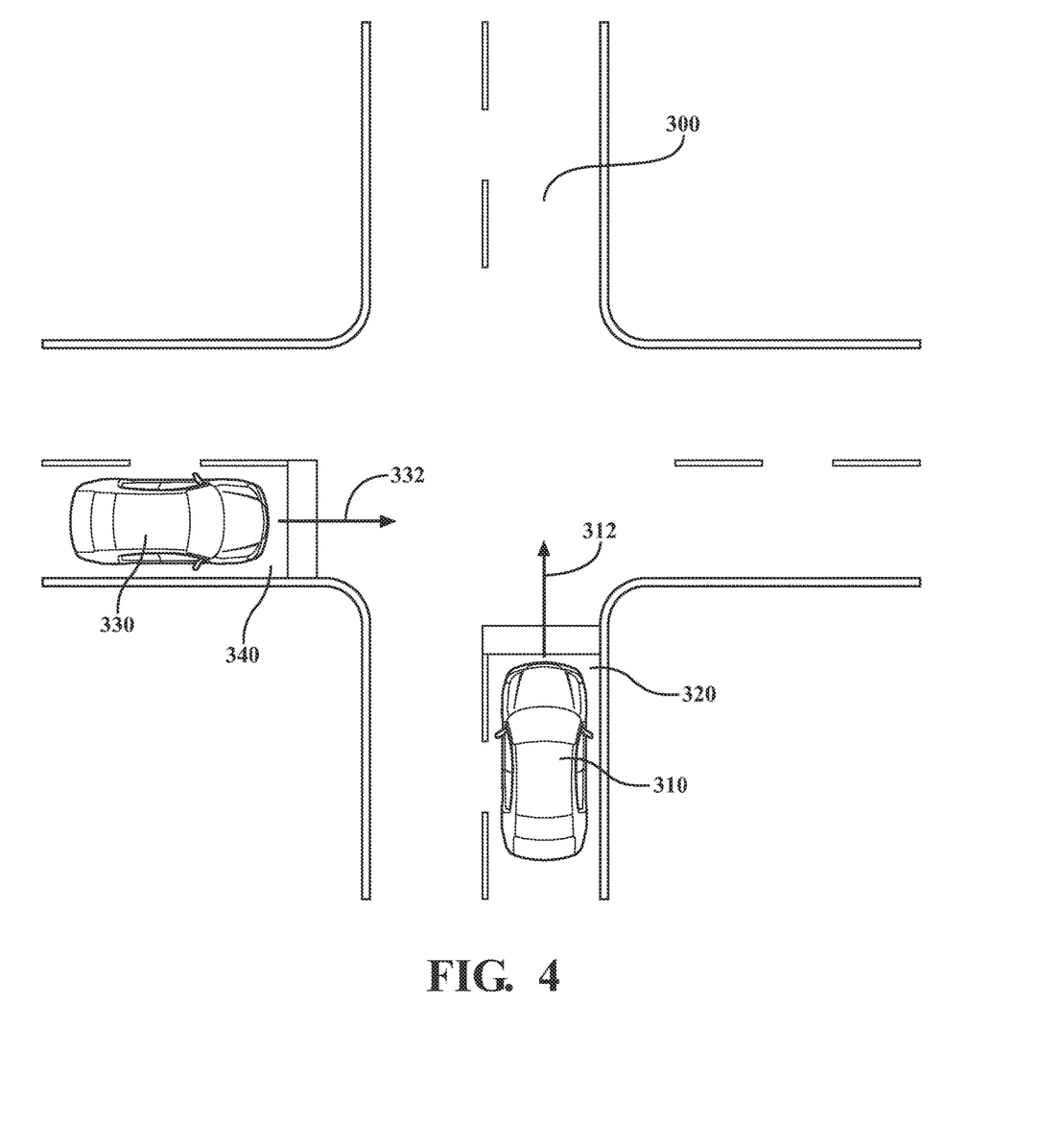
FIG. 4 illustrates an exemplary roadway intersection with a host vehicle operating the disclosed methods to evaluate a pressure score posed by a nearby vehicle, in accordance with the present disclosure.

FIG. 4 illustrates an exemplary roadway intersection 300 with a host vehicle 310 operating the disclosed methods to evaluate a pressure score posed by a neighborhood vehicle 330. The roadway intersection 300 is illustrated including four intersecting lanes of travel and accompanying traffic signs and/or signals. The host vehicle 310 is illustrated upon a lane of travel 320 entering the intersection from a bottom portion of FIG. 4. The host vehicle 310 includes therewithin a computerized device operating the methods disclosed herein. The neighborhood vehicle 330 is illustrated upon a lane of travel 340 entering the intersection from a left portion of FIG. 4. If the neighborhood vehicle 330 follows traffic signs such as a stop sign, the neighborhood vehicle 330 may be pruned away by a computerized device upon the host vehicle 310. However, in the example of FIG. 4, the neighborhood vehicle 330 is disregarding the traffic signs and is proceeding into the roadway intersection 300 without stopping. The computerized device within the host vehicle 310 may add to a pressure score assigned to the neighborhood vehicle 330 based upon the neighborhood vehicle 330 disregarding the traffic sign. Further, the computerized device within the host vehicle 310 may determine an estimated trajectory 312 of the host vehicle 310 and an estimated trajectory 332 of the neighborhood vehicle 330. Based upon the estimated trajectory 332 as compared to the estimated trajectory 312 and their comparison indicating a likely conflict created by the neighborhood vehicle 330 and its estimated trajectory 332, the computerized device within the host vehicle 310 may add to a pressure score assigned to the neighborhood vehicle 330.

Figure 5:
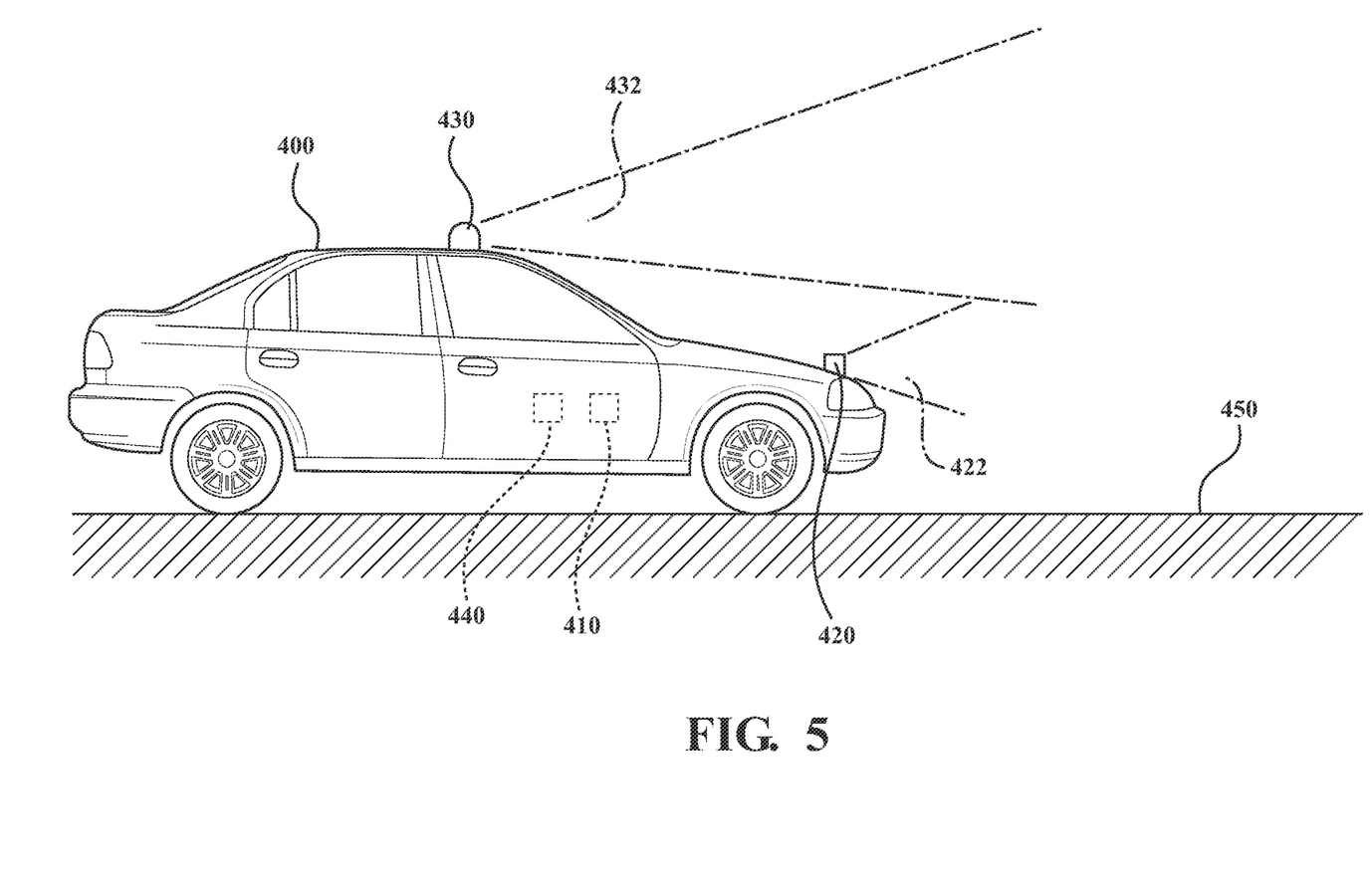
FIG. 5 schematically illustrates an exemplary host vehicle upon a roadway including the disclosed systems, in accordance with the present disclosure.

FIG. 5 schematically illustrates an exemplary host vehicle 400 upon a roadway 450 including the disclosed systems. The host vehicle 400 is illustrated including a computerized device 410 operating programming according to the methods disclosed herein. The host vehicle 400 further includes a camera device 420 providing data collected through a point of view 422, a LIDAR device 430 providing data collecting data through a point of view 432, and a computerized vehicle control unit 440 which provides control over navigation of the host vehicle 400 and includes data including operational information about the host vehicle 400, three dimensional vehicle location data of the host vehicle 400, and digital map database information. The computerized device 410 is in electronic communication with the camera device 420, the LIDAR device 430, and the vehicle control unit 440. The computerized device 410 operates programming according to the disclosed methods, utilizes data collected through the various connected devices, and provides pressure score information to the vehicle control unit 440 for use in creating and updating a navigational route for the host vehicle 400.

The computerized device and the vehicle control unit may each include a computerized processor, random-access memory (RAM), and durable memory storage such as a hard drive and/or flash memory. Each may include one or may span more than one physical device. Each may include an operating system and is operable to execute programmed operations in accordance with the disclosed methods. In one embodiment the computerized device and the vehicle control unit represent programmed methods operated by programming within a single device.

Figure 6:
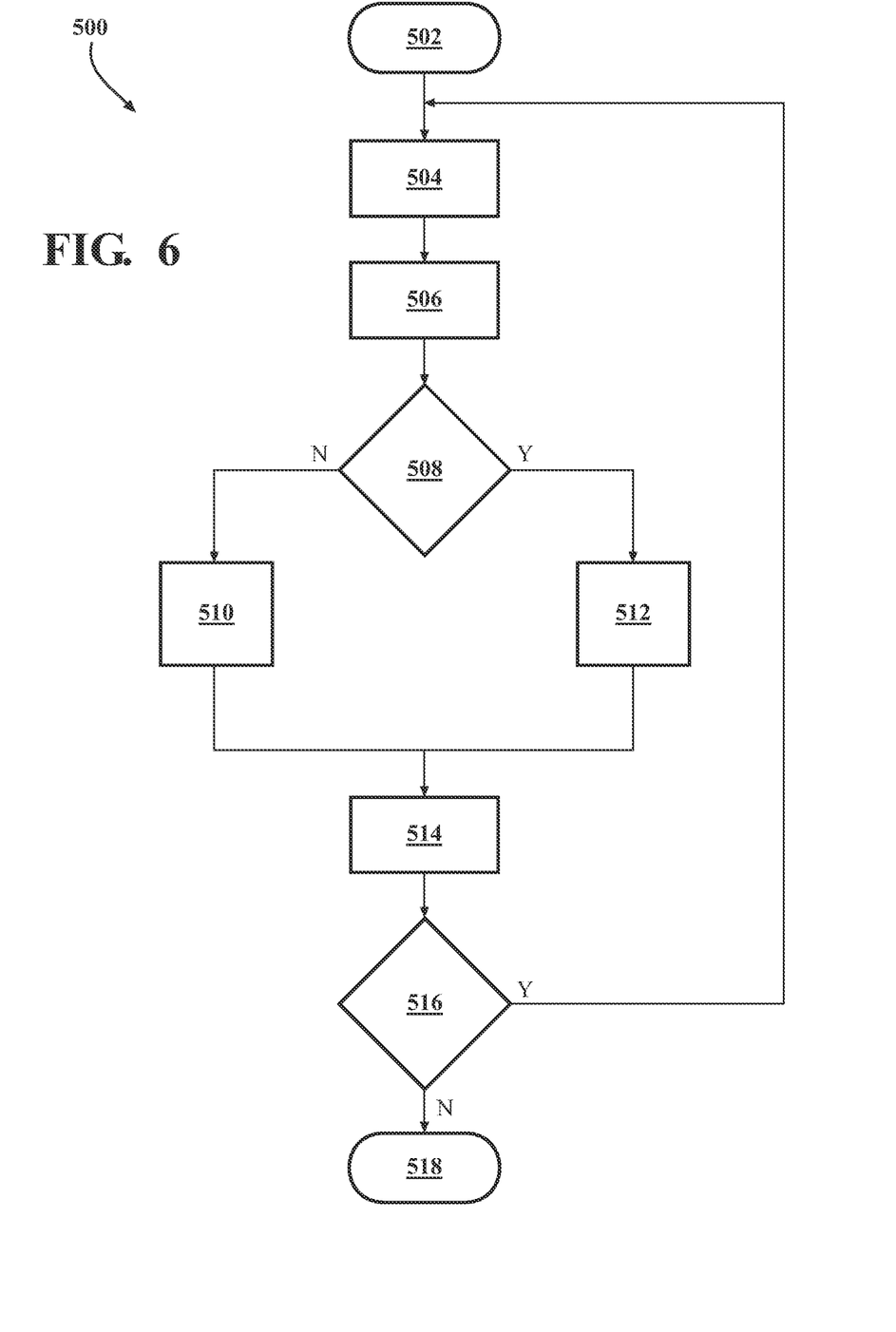
FIG. 6 is a flowchart illustrating an exemplary method for interactive hypothesis estimation of multi-vehicle traffic for autonomous driving, in accordance with the present disclosure.

FIG. 6 is a flowchart illustrating an exemplary method 500 for interactive hypothesis estimation of multi-vehicle traffic for autonomous driving. Method 500 starts at step 502. At step 504, a host vehicle employing method 500 collects sensor data from one or more available sensor devices. At step 506, a computerized device within the host vehicle filters the collected data and assigns a pressure score for a neighborhood object detected within an operating environment of the host vehicle. At step 508, the pressure score for the neighborhood object is compared to a threshold pressure score. If the pressure score for the neighborhood object is greater than the threshold pressure score, the method advances to step 512 where data related to the neighborhood object is maintained as information to be communicated to a vehicle control unit of the host vehicle. If the pressure score for the neighborhood object is not greater than the threshold pressure score, the method advances to step 510 where data related to the neighborhood object is pruned or redacted from the information to be communicated to the vehicle control unit. At step 514, data retained in step 512 is communicated to the vehicle control unit. At step 516, a determination is made whether the vehicle is continuing to operate. If the vehicle is continuing to operate, the method returns to step 504 to continue the method with new sets of collected data. If the vehicle does not continue to operate, the method advances to step 518 where the method ends. Method 500 is provided as an exemplary method for interactive hypothesis estimation of multi-vehicle traffic for autonomous driving. Additional or alternative method steps are envisioned, and the disclosure is not intended to be limited to the examples provided herein.

According to one exemplary embodiment, the disclosed method may include cascaded filtering. Cascaded filtering may include receiving lane boundary markings and vehicle poses from sensors providing perception or a point of view of a road surface and neighborhood objects within an operating environment of the host vehicle. Cascaded filtering may further include applying traffic control filtering and using map information segment vehicles based around lane topology. Cascaded filtering may further include segmenting vehicles by implausible trajectory, segmenting vehicles on speed, and applying proximity-based filtering to vehicles. Cascaded filtering may further include regrouping previous segments based upon proximity to other groups The disclosed exemplary embodiment may further include computing a pressure score. For each detected neighborhood vehicle, the method may include computing its respective pressure score in respect to its assigned cluster. Computing a pressure score in respect to its assigned cluster may include determining which vehicles within a cluster pose a highest likelihood of affecting the host vehicle. The disclosed exemplary embodiment may further include generating a kinematic hypothesis or for each vehicle, computing its respective pressure score in respect to its assigned cluster.

Equations 1-4 describe operations that may be utilized to determine pressure scores for detected objects.

$$a = \frac{(v(1-PS)-v)}{\delta t} \quad (1)$$

$$v = v + a \quad (2)$$

$$dx = v * \sin(\theta) * \delta t \quad (3)$$

$$dy = v * \cos(\theta) * \delta t \quad (4)$$

wherein a=acceleration, v=speed, PS=pressure score, x=x-coordinate location, y=y-coordinate location, t=time, and θ=orientation angle.

While the best modes for carrying out the disclosure have been described in detail, those familiar with the art to which this disclosure relates will recognize various alternative designs and embodiments for practicing the disclosure within the scope of the appended claims.

What is claimed is:

1. A system for interactive hypothesis estimation of multi-vehicle traffic for autonomous driving, comprising:
   a sensor upon a host vehicle providing data regarding an operating environment of the host vehicle; and
   a computerized device, operable to:
      monitor the data from the sensor;
      identify a road surface based upon the data;
      identify a neighborhood object based upon the data;
      determine a pressure score for the neighborhood object based upon a likelihood that the neighborhood object will conflict with the host vehicle based upon the road surface and the neighborhood object;
      selectively track the neighborhood object based upon the pressure score; and
      navigate the host vehicle based upon the tracking of the neighborhood object.

2. The system of claim 1, wherein the computerized device identifying the neighborhood object includes:
   identifying a location of the neighborhood object; and
   identifying an orientation of the neighborhood object.

3. The system of claim 2, wherein the computerized device identifying the neighborhood object further includes identifying a trajectory of the neighborhood object.

4. The system of claim 3, wherein the computerized device is further operable to:
monitor a trajectory of the host vehicle; and
compare the trajectory of the neighborhood object to the trajectory of the host vehicle; and
wherein determining the pressure score for the neighborhood object is further based upon the comparing.

5. The system of claim 1, wherein determining the pressure score for the neighborhood object based upon the likelihood that the neighborhood object will conflict with the host vehicle based upon the road surface includes identifying lanes of travel upon the road surface.

6. The system of claim 5, wherein determining the pressure score for the neighborhood object based upon the likelihood that the neighborhood object will conflict with the host vehicle based upon the road surface further includes analyzing the lanes of travel and determining the likelihood based upon a context of the road surface.

7. The system of claim 5, wherein determining the pressure score for the neighborhood object based upon the likelihood that the neighborhood object will conflict with the host vehicle based upon the road surface further includes:
identifying an area upon the road surface that is one of coincident to, running parallel to and in a same direction as, and intersecting with a lane of travel occupied by the host vehicle;
when the neighborhood object is within the area upon the road surface, determining that the likelihood is above a threshold value; and
when the neighborhood object is outside the area upon the road surface, determining that the likelihood is below the threshold value.

8. The system of claim 1, wherein selectively electing to track the neighborhood object based upon the pressure score includes:
when the pressure score is above a threshold value, electing to track the neighborhood object; and
when the pressure score is below the threshold value, electing not to track the neighborhood object.

9. The system of claim 1, wherein the sensor upon the host vehicle includes: a LIDAR device providing data regarding the road surface; and
a camera device providing data regarding the neighborhood object.

10. A method for interactive hypothesis estimation of multi-vehicle traffic for autonomous driving, comprising:
within a computerized processor within a host vehicle,
monitoring data regarding an operating environment of the host vehicle provided by a sensor upon the host vehicle;
identifying a road surface based upon the data;
identifying a neighborhood object based upon the data;
determining a pressure score for the neighborhood object based upon a likelihood that the neighborhood object will conflict with the host vehicle based upon the road surface and the neighborhood object;
selectively tracking the neighborhood object based upon the pressure score; and
navigating the host vehicle based upon the tracking of the neighborhood object.

11. The method of claim 10, wherein identifying the neighborhood object includes:
identifying a location of the neighborhood object; and
identifying an orientation of the neighborhood object.

12. The method of claim 11, wherein identifying the neighborhood object further includes identifying a trajectory of the neighborhood object.

13. The method of claim 12, further comprising, within the computerized processor:
monitoring a trajectory of the host vehicle; and
comparing the trajectory of the neighborhood object to the trajectory of the host vehicle; and
wherein determining the pressure score for the neighborhood object is further based upon the comparing.

14. The method of claim 10, wherein determining the pressure score for the neighborhood object based upon the likelihood that the neighborhood object will conflict with the host vehicle based upon the road surface includes identifying lanes of travel upon the road surface.

15. The method of claim 14, wherein determining the pressure score for the neighborhood object based upon the likelihood that the neighborhood object will conflict with the host vehicle based upon the road surface further includes analyzing the lanes of travel and determining the likelihood based upon a context of the road surface.

16. The method of claim 14, wherein determining the pressure score for the neighborhood object based upon the likelihood that the neighborhood object will conflict with the host vehicle based upon the road surface further includes:
identifying an area upon the road surface that is one of coincident to, running parallel to and in a same direction as, and intersecting with a lane of travel occupied by the host vehicle;
when the neighborhood object is within the area upon the road surface, determining that the likelihood is above a threshold value; and
when the neighborhood object is outside the area upon the road surface, determining that the likelihood is below the threshold value.

17. The method of claim 10, wherein selectively electing to track the neighborhood object based upon the pressure score includes:
when the pressure score is above a threshold value, electing to track the neighborhood object; and
when the pressure score is below the threshold value, electing not to track the neighborhood object.

18. The method of claim 10, wherein monitoring the sensor upon the host vehicle includes:
monitoring a LIDAR device providing data regarding the road surface; and
monitoring a camera device providing data regarding the neighborhood object.

* * * * *